United States Patent [19]

Aoyagi et al.

[11] Patent Number: 4,996,616
[45] Date of Patent: Feb. 26, 1991

[54] HEAD SUSPENSION LOAD BEAM WITH REINFORCING RIBS

[75] Inventors: Akihiko Aoyagi, Yamato; Tatsuya Endo, Fujisawa; Hiroshi Terashima, Fujisawa, all of Japan

[73] Assignee: International Business Machines Corporation, Armonk, N.Y.

[21] Appl. No.: 340,335

[22] Filed: Apr. 19, 1989

[30] Foreign Application Priority Data

Apr. 22, 1988 [JP]  Japan .................................. 63-98477

[51] Int. Cl.⁵ .......................... G11B 5/48; G11B 5/60
[52] U.S. Cl. ..................................... 360/104; 360/103
[58] Field of Search ............... 360/103, 104, 105, 108, 360/130.3–130.34

[56] References Cited

U.S. PATENT DOCUMENTS

| | | | |
|---|---|---|---|
| 3,931,641 | 1/1976 | Watrous | 360/104 X |
| 4,204,233 | 5/1980 | Stollorz | 360/103 X |
| 4,760,478 | 7/1988 | Pal et al. | 360/104 X |
| 4,884,154 | 11/1989 | Onodera et al. | 360/104 X |

FOREIGN PATENT DOCUMENTS

| | | | |
|---|---|---|---|
| 62-205567 | 9/1987 | Japan | 360/104 |
| 63-144473 | 6/1988 | Japan | 360/103 |
| 63-144474 | 6/1988 | Japan | 360/103 |
| 63-144475 | 6/1988 | Japan | 360/103 |

Primary Examiner—A. J. Heinz
Assistant Examiner—Alfonso Garcia
Attorney, Agent, or Firm—Thomas R. Berthold; Henry E. Otto, Jr.

[57] ABSTRACT

A head suspension load beam for a disk file has a slender base portion shaped like a plate, one end of which is secured to a head actuator arm, and the other end of which supports a head. The base portion is reinforced by bending a side margin portion in the longitudinal direction of the base portion at substantially right angles to the plane of the base portion, and further by providing reinforcement ribs, the height of which does not exceed the height of the bent side margin portion, almost parallel to the side margin portion. A head suspension load beam of another embodiment of this invention is reinforced by bending the side margin portion substantially parallel with the plane of the base portion or further toward the plane of the base portion, instead of using reinforcement ribs.

1 Claim, 2 Drawing Sheets

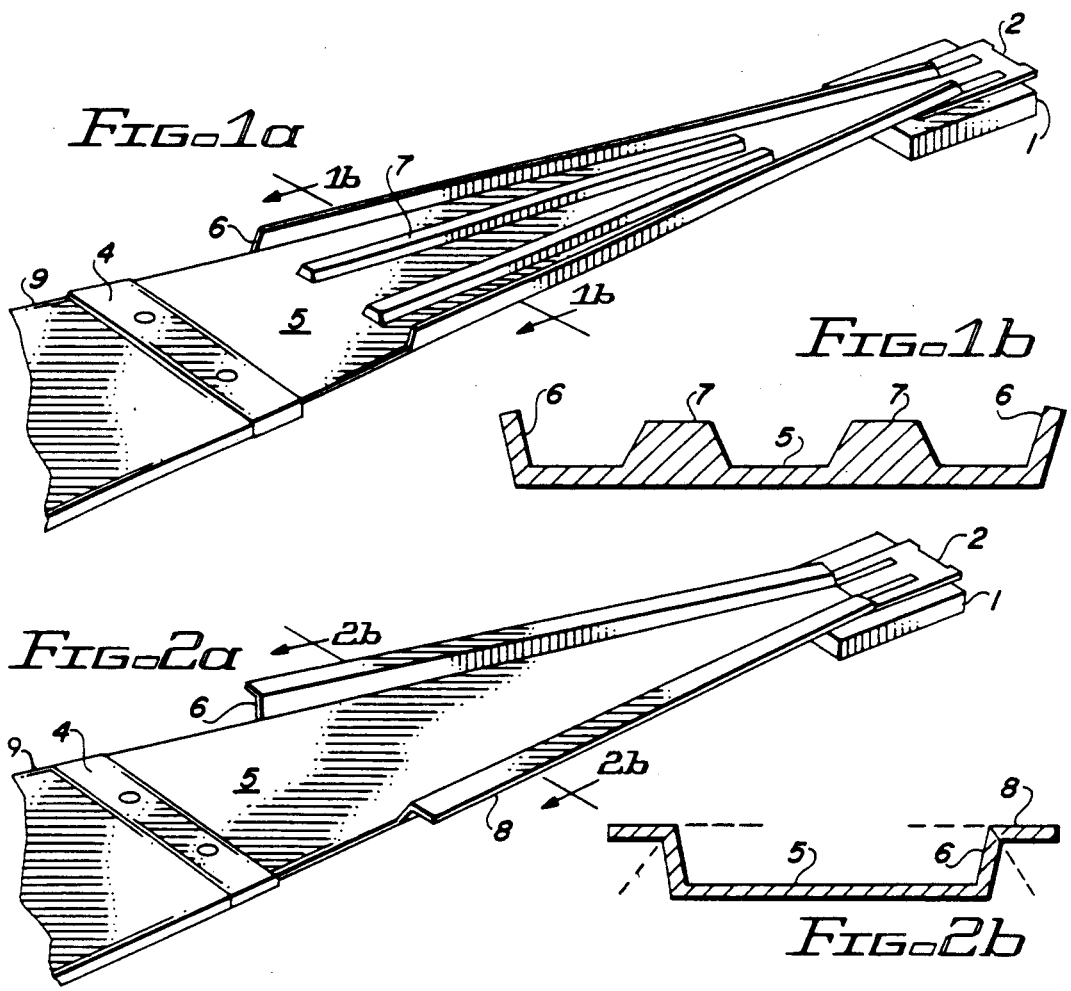
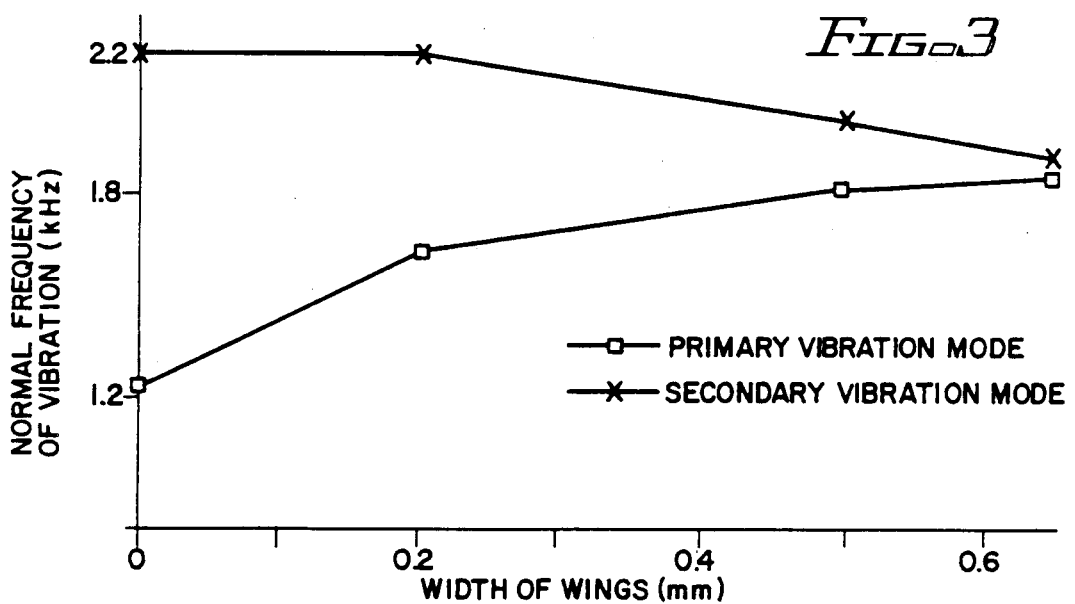

HEAD SUSPENSION LOAD BEAM WITH REINFORCING RIBS

TECHNICAL FIELD

This invention relates to a head suspension load beam with small height and excellent mechanical properties enabling the number of disks and heads to be increased without increasing the height of the magnetic disk device.

BACKGROUND OF THE INVENTION

In almost all present disk devices, both small and large, a head suspension assembly of the structure as shown in FIG. 4 disclosed in Japanese Published Examined Patent Application No. 58-22827 is used. FIGS. 4(a) and (b) show a perspective view and a side view of a prior art head suspension assembly, respectively. The head suspension assembly 40 consists of a slider 1 having a coil for writing and reading data relative to a magnetic disk 30, a flexure 2 or a gimbal spring for supporting the slider 1, a load beam 3 for holding the flexure 2, and a mounting block 4 for fixing the load beam 3 on the arm. This head suspension assembly 40 is connected to a head actuator arm 9.

The slider is held by the head suspension assembly so that the slider can travel in a stable manner over the disk at a constant distance therefrom. In particular, the slider must be held in operation at a constant distance from the disk regardless of the distortion of the disk surface or external vibrations. If the distance between the slider and the disk cannot be held constant, write failure and/or read error may occur. In the worst case, the head will collide against the disk causing head crash. Once head crash occurs, written data cannot be read any more.

In order to hold the slider at a constant distance from the disk, the load beam of the head suspension assembly is provided with the required level of mechanical properties such as natural frequency and rigidity by bending the edges 6 upward as shown in FIG. 4. That is, the load beam has a structure consisting of a long, narrow plate-like base 5, and edges 6 bent upward from the base 5. Although the height h of the load beam (i.e., the height of the edges 6) depends on the material of the load beam, it cannot be reduced below a certain value, or its mechanical properties will be degraded. The reason is that if the height h is lower than the above certain value, the natural frequency of the load beam decreases, which alters the allowable frequency of operation of the head positioning servo system. Also, the resistance of the load beam against bending weakens, which affects the head access operation.

In magnetic disk devices, particularly in small hard disk devices, increases in both head access speed and storage capacity are required as the improvements are made in the performance of personal computers in which such disk devices are incorporated.

When the head access operation speed is increased, the natural frequency of mechanical parts for such operation, especially of a head suspension load beam must be high; and therefore, the rigidity of each part must be high.

On the other hand, two approaches are employed for increasing storage capacity an increase in the amount of information stored on a disk, and an increase in the number of disks used in a disk device. For the former, the amount of information has been increased to a considerable level by the use of thin film magnetic disks, thin film heads, and MIG (Metal In Gap) heads. For the latter, the external dimensions, especially the height, of disk devices are limited because they are incorporated in personal computers. Therefore, it is difficult to increase the numbers of disks and heads without increasing the height of the disk devices.

In fact, although the thickness of a disk has been decreased by replacing the aluminum substrate with glass, it is impossible to further decrease disk thickness because of problems relating to magnetic properties as well as the mechanical strength of the disk. Also, decrease in the height of a load beam lowers the natural frequency in the primary vibration mode, causing problems in the head access operation.

It is desired, therefore, to find a means to decrease the height of a load beam without degrading its mechanical properties.

The inventor examined means to solve this problem. First, the inventor considered the fabrication of a load beam with a material of high rigidity to decrease its height. However, such a material was difficult to machine precisely, and the high rigidity of the material made it difficult for the slider to travel properly. Also, the use of such a special material led to an increase in production costs. Therefore, desirable effects cannot be expected from the selection of such a material.

Next, experiments to minimize the influence of reducing the height of the load beam on its mechanical properties were carried out by increasing the thickness of the load beam. As the thickness of the load beam was increased, its natural frequency increased. However, the spring constant of the load beam was also increased significantly. The great change in the value of the spring constant affects the traveling characteristics of the slider, and the performance and reliability of the magnetic disk device are significantly lowered. By such an increase in thickness, therefore, the improvement of mechanical properties cannot be expected.

Further experiments were carried out to minimize the influence of reducing the height of the load beam on its mechanical properties by decreasing the length of the load beam. As the length of the load beam was decreased, its natural frequency increased moderately, and the change in the spring constant was small. In order to increase natural frequency to the desired value, however, the length of the load beam must be considerably shortened, resulting in a large increase of the spring constant. Therefore, a decrease in the length of the load beam will not improve its mechanical properties sufficiently.

Since the selection of such materials, increase in thickness, or decrease in length will not reduce the height of the load beam effectively, for example, in a small 3.5 inch hard disk device, the maximum numbers of disks and heads are limited to 4 and 8, respectively, due to the limitation of the height.

Nevertheless, in order to achieve an increase in the storage capacity of a magnetic disk device, the numbers of disks and heads used in a disk device must be increased.

SUMMARY OF THE INVENTION

An object of this invention is to provide a suspension load beam which has a small height and excels in mechanical properties. By the use of a head suspension load beam of this invention, a magnetic disk device with an increased number of disks and heads is provided.

A head suspension load beam of a preferred embodiment of this invention has a slender base portion shaped like a plate, one end of which is secured to a head actuator arm, and the other end of which supports a head. The base portion is reinforced by bending a side margin portion in the longitudinal direction of the base portion at substantial right angles to the plane of the base portion, and further by providing reinforcement member, the height of which does not exceed the height of the bent side margin portion, almost parallel to the side margin portion. A head suspension load beam of another preferred embodiment of this invention is reinforced by bending the side margin portion substantially parallel with the plane of the base portion or further toward the plane of the base portion, instead of using the reinforcement member.

The provision of reinforcement member can be achieved by fixing rod-type ribs on the base portion, or by forming drawn ribs using a press. When drawn ribs are used, since a sheet metal such as a stainless steel sheet is simply drawn, the head suspension load beam can be fabricated easily.

The use of a structure providing the reinforcement member not higher than the side margin portion on the base portion, or a structure bending the side margin portion substantially parallel with the plane of the base portion or further toward the plane of the base portion enables the natural frequency of the primary vibration mode to be maintained at a practically required level without degrading the mechanical properties, especially rigidity, even if the height of the load beam is decreased to one half of the conventional minimum value.

BRIEF DESCRIPTION OF THE DRAWINGS

FIG. 1a shows a perspective view of a head suspension load beam of a structure provided with drawn ribs according to this invention.

FIG. 1b shows a cross-sectional view of the structure of FIG. 1a along the line 2A—2A'.

FIG. 2a shows a perspective view of a head suspension load beam of a structure provided with wings according to this invention.

FIG. 2b shows a cross-sectional view of the structure of FIG. 2a along the line 2B—2B'.

FIG. 3 is a graph showing the relationship between natural frequencies and the widths of wings.

DESCRIPTION OF THE PREFERRED EMBODIMENTS

Figure 4A:
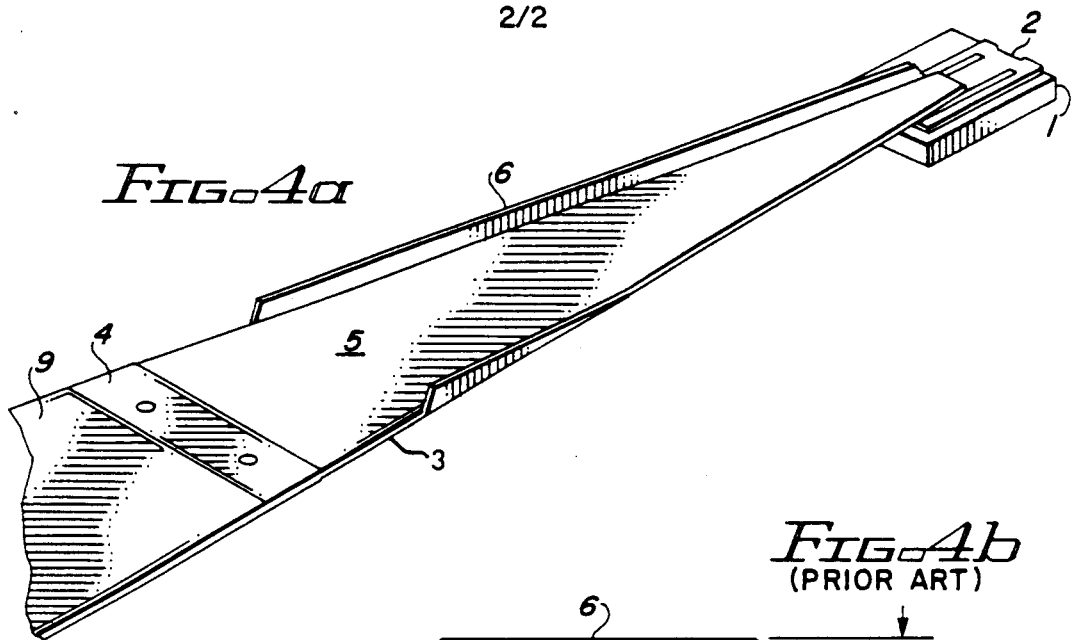
FIGS. 4a and 4b show a perspective view and a side view of a conventional head suspension assembly, respectively.

Referring to FIG. 1, a head suspension load beam of an embodiment of this invention which has a structure provided with drawn ribs for reinforcement is shown. FIG. 1(a) shows a perspective view thereof, and FIG. 1(b) shows a cross-sectional view thereof along the line 2A—2A. The head suspension load beam 10 has a base 5 and edge sections 6, and the base 5 is provided with drawn ribs 7 for reinforcement. The base 5 is made of a long, narrow piece of sheet metal. The edge sections 6 are bent upward almost perpendicularly to the base 5. The drawn ribs 7 have a height not exceeding the height of the edge sections 6, and are formed almost parallel to the edge sections 6. The head suspension load arm 10 is connected to a head actuator arm 9 using a mounting block 4.

Referring now to FIG. 2, a head suspension load beam of another embodiment of this invention is shown, which has a structure with perpendicularly bent sections further bent almost parallel to the base. FIG. 2(a) shows a perspective view thereof, and FIG. 2(b) shows a cross-sectional view thereof along the line 2B—2B. The head suspension load beam 20 of this embodiment also has a base 5 and edge sections 6 similar to the embodiment of FIG. 1, and the edge sections 6 are provided with wings 8 of a height not exceeding the height of the edge sections 6. The wings 8 may be bent downward in the head supporting direction as shown by the broken lines in FIG. 2(b). Although FIG. 2 shows an example of the load beam with the edge sections bent outward, the edge sections may be bent inward as shown by the dotted lines in FIG. 2(b).

Lead wires used to connect to the head are provided on the back side of the load beam, that is, the opposite side from the head supporting side, thereby the lead wires are not exposed to wind caused by the rotation of disks and the aerodynamic action of the wind on the load beam is not disturbed. Consequently, in head positioning, the occurrence of disturbance can be prevented.

Although FIGS. 1 and 2 show examples of load beams having edge sections bent upward, i.e., in the opposite direction to the head supporting side, the edge sections may be bent downward, i.e., toward the head supporting side. In such a case, reinforcing members are provided on the bottom of the base, i.e., on the head supporting side.

Figure 6:
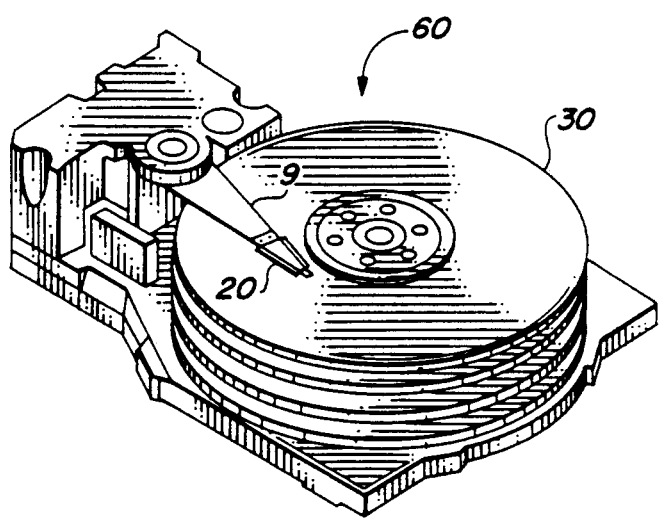
FIG. 6 shows a perspective view of a magnetic disk device using a head suspension load beam of this invention.

FIG. 6 shows a magnetic disk device 60 having increased numbers of disks and heads by employing head suspension load beams 20 of this invention.

The mechanical advantages of the head suspension having a structure according to this invention will be described below.

Figure 4B:
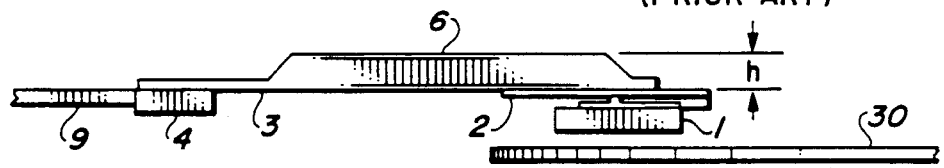

First, a conventional load beam 40 as shown in FIG. 4 was analyzed. The result showed that the natural frequency of the primary vibration mode was about 2 kHz.

Figure 5:
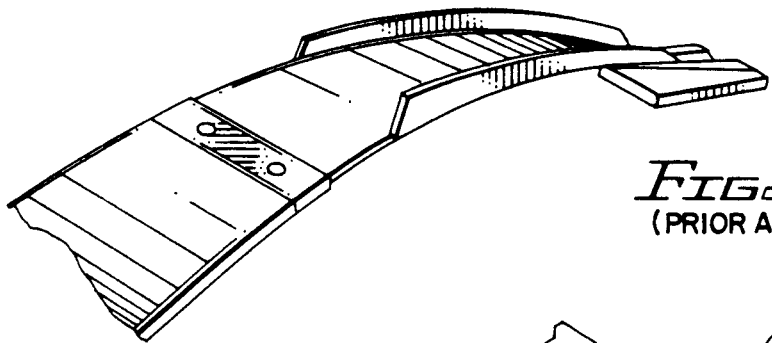
FIG. 5 shows a perspective view of a shape of the primary vibration mode of a load beam having a height half the height of conventional load beams.

Next a load beam having a height half the height of the conventional load beam was fabricated and analyzed in the same manner. The result showed that the natural frequency of the primary vibration mode decreased to 1.2 kHz, and in this primary vibration mode, the load beam became formed as shown in FIG. 5. Thus, it was found that reduction of height was not practical because of the decrease in natural frequency of the primary vibration mode. On the other hand, since natural frequencies of secondary or higher modes were 2 kHz or more, although they decreased slightly, no improvement was required. For the reduction of load beam height, therefore, it is sufficient to consider natural frequencies of the primary vibration mode.

Then, a load beam having a half height of a conventional load beam, and provided with drawn ribs 7 as shown in FIG. 1 was analyzed. The result showed that the natural frequency of the primary vibration mode was about 1.6 kHz, about a 400 Hz increase from that without ribs. Since such a decrease in natural frequency causes no problems in practical use, the provision of drawn ribs has made it possible for the height of the load beam to be halved.

A load beam having a height half the height of a conventional load beam, and provided with wings 8 as shown in FIG. 2 was also examined. The result showed that the natural frequency of the primary vibration mode was about 1.8 kHz about a 600 Hz increase from that without wings. The halving of the height of the load beam has also been made possible by the provision of wings.

With either the provision of drawn ribs or wings, natural frequencies of secondary or higher vibration modes were 2 kHz or more, causing no problems.

Furthermore, by specifying the forms of drawn ribs or wings, the natural frequency of the load beam can be optimized.

For example, the cross-section of a drawn rib may be quadrangular, triangular or semicircular. When a quadrangular, especially when a trapezoidal cross-section was used, the natural frequency of the primary vibration mode was found to be about 1.6 kHz, and about a 400 Hz increase was achieved. In the case of a triangular cross-section, the natural frequency was about 1.4 Hz, an increase of about 200 Hz. In this case, however, the edge of the triangular rib was difficult to bend accurately at an acute angle by pressing or bending.

FIG. 3 shows the results of measurements on a stainless steel load beam having a thickness of 76 μm and a length of 30 mm. As the width of wings was increased, the natural frequency of the primary vibration mode increased, while the natural frequency of the secondary vibration mode decreased. From these results, the preferable wing width was found to be 0.2 to 0.5 mm.

Although the above embodiments were described on a load beam having either drawn ribs or wings, a structure having both of them, or a combined structure with such reinforcement and a shortened beam length may also be used, thereby improving the natural frequency characteristics in the primary vibration mode.

As described above, according to this invention, the numbers of disks and heads can be increased without increasing the height of a magnetic disk device. Consequently, the storage capacity of a conventional magnetic device can be increased easily without significant technical changes.

What is claimed is:

1. A head suspension load beam including a flat thin base portion secured to a head actuator arm at one end and supporting a head at the other end, said load beam being reinforced by (a) bending opposite side margin portions in a longitudinal direction of said base portion at substantially right angles to a plane of said base portion, and (b) providing a pair of reinforcing ribs on said base portion, each reinforcing rib having a trapezoidal cross section and being not higher than said side margin portions and substantially parallel to a respective one of said side margin portions, whereby a desired spring constant and degree of rigidity can be achieved with side margin portions and reinforcing ribs of reduced height.

* * * * *